United States Patent [19]

Hayashi et al.

[11] Patent Number: 5,355,573
[45] Date of Patent: Oct. 18, 1994

[54] POSITIONING STRUCTURE FOR FRAME AND BRACKETS IN MODULAR-TYPE WIPER DEVICE

[75] Inventors: Akira Hayashi; Hirokazu Nakano, both of Kiryu, Japan

[73] Assignee: Mitsuba Electric Manufacturing Co., Ltd., Gunma, Japan

[21] Appl. No.: 937,418

[22] Filed: Aug. 31, 1992

[30] Foreign Application Priority Data

Sep. 6, 1991 [JP] Japan .............................. 3-079867[U]

[51] Int. Cl.⁵ .............................................. B25B 27/14
[52] U.S. Cl. .................................. 29/281.1; 269/900; 269/47; 29/281.5
[58] Field of Search ................... 29/271, 281.1, 281.5; 464/467; 269/47, 52, 303, 305, 309, 900, 272

[56] References Cited

U.S. PATENT DOCUMENTS

| | | | |
|---|---|---|---|
| 3,622,145 | 11/1971 | Gibson | 269/305 |
| 4,828,240 | 5/1989 | Longenecker et al. | 269/900 |
| 4,989,846 | 2/1991 | Quinn | 269/900 |
| 5,064,321 | 11/1991 | Barnes | 269/900 |

FOREIGN PATENT DOCUMENTS

WO91/06450  5/1991  European Pat. Off. .
2195880A    4/1988  United Kingdom .

*Primary Examiner*—Robert C. Watson
*Attorney, Agent, or Firm*—Oliff & Berridge

[57] ABSTRACT

In a positioning structure for a frame and brackets in a modular-type wiper device, a positioning protrusion provided on an assembly jig is passed thorough a first positioning hole provided in the frame of the device and fitted into a positioning recess provided in each of the device brackets so as to set the frame and the brackets in position with respect to the assembly jig, and a positioning protrusion provided on each of the brackets is passed through a second positioning hole provided in the frame so as to effect a relative positioning between the frame and each bracket.

5 Claims, 5 Drawing Sheets

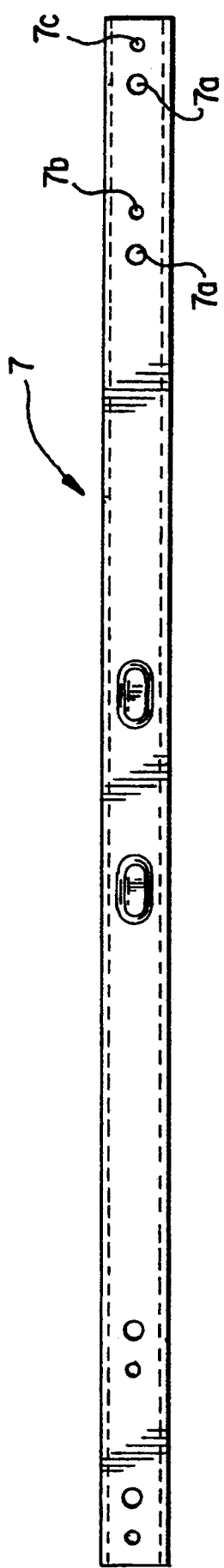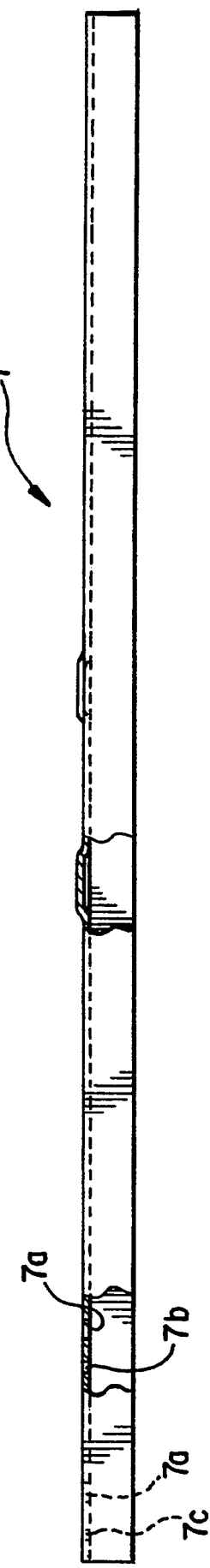

POSITIONING STRUCTURE FOR FRAME AND BRACKETS IN MODULAR-TYPE WIPER DEVICE

BACKGROUND OF THE INVENTION

1. Field of the Invention

The present invention relates to a positioning structure for a frame and brackets in a modular-type wiper device that is to be mounted on a vehicle, such as a passenger car, bus, or truck.

2. Description of Related Art

Conventionally, such a modular-type wiper device has been formed by die forming and integrating a first bracket to which the wiper motor is attached with a second bracket to which the wiper shaft is attached. However, in view of the recent strict demand for reduction in weight, the present applicant has proposed, for example, in Japanese Application for Utility Model Registration No. 2-115569, a structure in which a reduction in weight and size is attained by integrally connecting the first and second brackets by a cylindrical tubular member. In this proposed structure, the first and second brackets are fastened to the end portions of the tubular member by means of bolts. A problem with this structure is that it requires blind nuts, which are rather expensive, on the side of the tubular member. Moreover, such blind nuts must be in conformity with the inner configuration of the tubular member, so that it is necessary to prepare different blind nuts for different inner frame configurations, resulting in poor versatility.

In view of this, a structure has been proposed in which a channel-type frame having a substantially U-shaped cross-section is used and the brackets are fastened thereto by means of general-purpose bolts and nuts. In such a structure, the relative positioning between the frame and the brackets at the time of fastening by bolts and nuts has been conducted by utilizing the bolt holes provided in the frame and the brackets. However, in the case of an automated bolt fastening process, the frame and the brackets are set in position on an assembly jig and, in this condition, the automatic bolt fastening is conducted. Thus, it is impossible to perform the above-mentioned relative positioning between the frame and the brackets by utilizing the bolt holes. To perform this relative positioning, it would be necessary to provide the assembly jig with members for positioning the frame and the brackets, resulting in an increase in the size of the assembly jig. Even then, some measure would have to be taken to achieve an improvement in operational efficiency so as to facilitate the setting of the frame and the brackets on the assembly jig. This might be achieved by enlarging the play at the time of setting. However, that would involve a deterioration in the accuracy of the relative positioning between the frame and the brackets. If the frame and the brackets were fastened to each other in that condition, various problems would be involved, such as a dispersion in the wiping range of the wiper arm. To avoid this, some other measure must be taken to effect the positioning between the frame and the brackets with a still higher level of accuracy.

SUMMARY OF THE INVENTION

The present invention has been made in view of the above problems in the prior art. It is an object of the present invention to provide a positioning structure for a frame and brackets in a modular-type wipe device which helps to eliminate these problems. In accordance with the present invention, there is provided a positioning structure for a frame and brackets in a modular-type wiper device in which a first bracket to which a wiper motor is attached and a second bracket to which a wiper shaft is attached are integrally connected together through a channel-like frame having a substantially U-shaped cross section, wherein in fastening the frame and the first and second brackets to each other by means of bolts and nuts, a positioning protrusion provided on an assembly jig is passed through a first positioning hole provided in the frame and fitted into a positioning recess provided in each of the brackets, and a positioning protrusion provided on each of the brackets is passed through a second positioning hole provided in the frame, thereby effecting a relative positioning between the frame and the brackets.

Due to this arrangement, the present invention facilitates the setting and positioning of the frame and the brackets on the assembly jig and, at the same time, enables the frame and the brackets to be accurately positioned with respect to each other.

BRIEF DESCRIPTION OF THE DRAWINGS

FIGS. 4(A) and 4(B) are a plan view and a partly cutaway front view of the frame;

DETAILED DESCRIPTION OF THE PREFERRED EMBODIMENT

Figure 1:
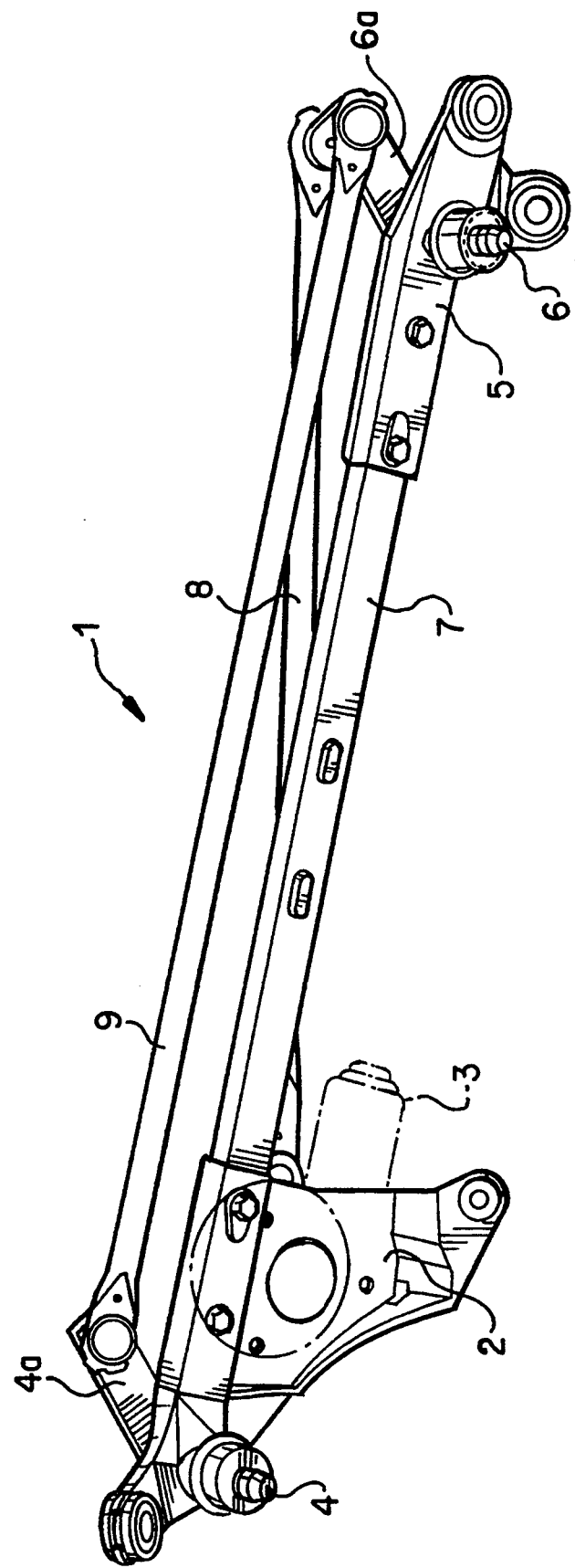
FIG. 1 is a perspective view of a wiper device.
Figure 2:
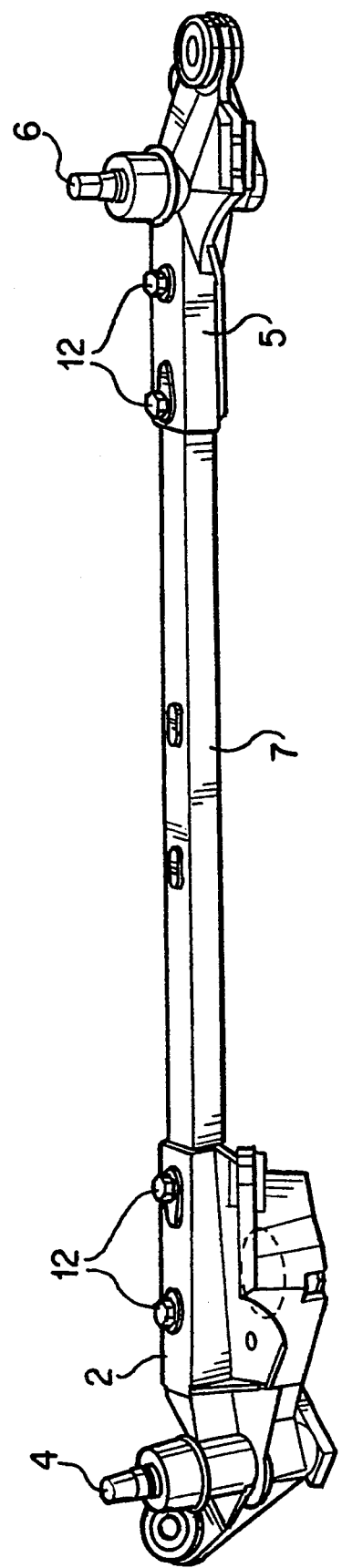
FIG. 2 is a front view showing brackets and frame connected to each other.
Figure 3:
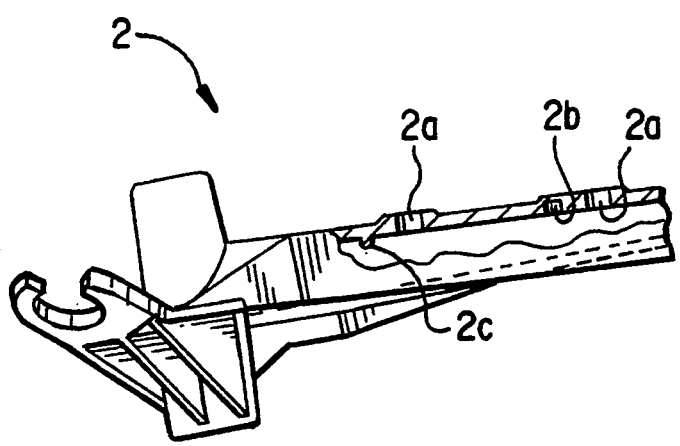
FIG. 3 is a rear view, partly cutaway, of a first bracket.

An embodiment of the present invention will now be described with reference to the drawing, in which numeral 1 indicates a modular-type wiper device including first and second brackets 2 and 5 formed by aluminum die casting. Provided on the first bracket 2 are a wiper motor 3 and a first wiper axle 4. Provided on the second bracket 5 is a second wiper axle 6 which differs from the one mentioned above. The first and second brackets 2 and 5 are integrally connected to each other together by using a channel-like frame 7 formed by bending an ironplate in such a way as to define a substantially U-shaped cross section. A first wiper link 8 is provided between a motor arm (not shown) attached to the motor shaft of the wiper motor 3 and a link arm 6a provided on the wiper axle 6 on the side of the second bracket 5. Further, a second wiper link 9 is provided between the link arm 6a and a link arm 4a provided on the wiper axle 4 provided on the side of the first bracket 2. A reciprocating swinging motion of the link arms 4a and 6a generated by driving the wiper motor 3 causes the wiper axles 4 and 6 to rotate, thereby effecting a wiping operation.

Next, assembly structures for the first and second brackets 2 and 5 and the frame 7 by a bolt fastening process will be described. The assembly structure for connecting the second bracket 5 with the frame 7 is the same as that for connecting the first bracket 2 with the frame, so that a description of the former will be omitted here. In the following, only the assembly structure for the first bracket 2 and the frame 7 will be described.

The first bracket 2 and the frame 7 are connected together by means of two bolts 12. The connection is effected on an assembly jig 10 having a rectangular-prism-shaped section, onto which the frame 7 is to be fitted. Provided on the upper surface of this rectangular-prism-shaped section of assembly jig 10 are holes 10a which are similar in configuration to that of the two bolts 12 but are somewhat larger than them. These holes serve as indentations for accepting nuts 11 in the bolt fastening process. Further, a positioning protrusion 10b is provided in a middle section between the two holes 10a. The frame 7, which is to be fitted onto the assembly jig 10, has a pair of bolt holes 7a, through which the bolts 12 are to be passed, and a first positioning hole 7b which is in a middle section between the bolt holes 7a and through which the above positioning protrusion 10b is to be passed. The first bracket 2, which is to be fitted onto the frame 7, has a pair of bolts holes 2a through which the bolts 12 are to be passed, and a positioning recess (which may naturally be a hole-like recess) 2b into which the above-mentioned positioning protrusion 10b is to be fitted and which is positioned in a middle section between the bolt holes 2a. Further, formed on that surface of the first bracket 2 facing the frame 7 in the front end portion thereof is a positioning protrusion 2c having a substantially truncated-cone-like configuration. The positioning protrusion 2c passes through a second positioning hole 7c formed in the frame 7, thereby effecting a high-accuracy positioning between the first bracket 2 and the frame 7, with the tip of the protrusion 2c being fitted with some play into a recess 10c formed on the assembly jig 10. In setting the frame 7 and the first bracket 2 on the assembly jig 10, the frame 7 is first set on the jig 10 in such a way that the positioning protrusion 10b is passed through the first positioning hole 7b, and then the first bracket 2 is set in such a way that the positioning protrusion 2c is passed through the second positioning hole 7c of the frame 7 and fitted with some play into the recess 10c of the assembly jig 10 and, at the same time, the positioning protrusion 10b passed through the first positioning hole 7b is fitted into the recess 2b of the first bracket 2. When the setting has been effected in this way, automatic bolt fastening is conducted.

In this embodiment of the present invention, constructed as described above, the wiper device is formed by integrally connecting the first and second brackets 2 and 5 through the frame 7, and the bolt fastening of the brackets 2 and 5 to the frame 7 can be conducted with the brackets and the frame correctly set and positioned on the assembly jig 10.

Figure 5A:
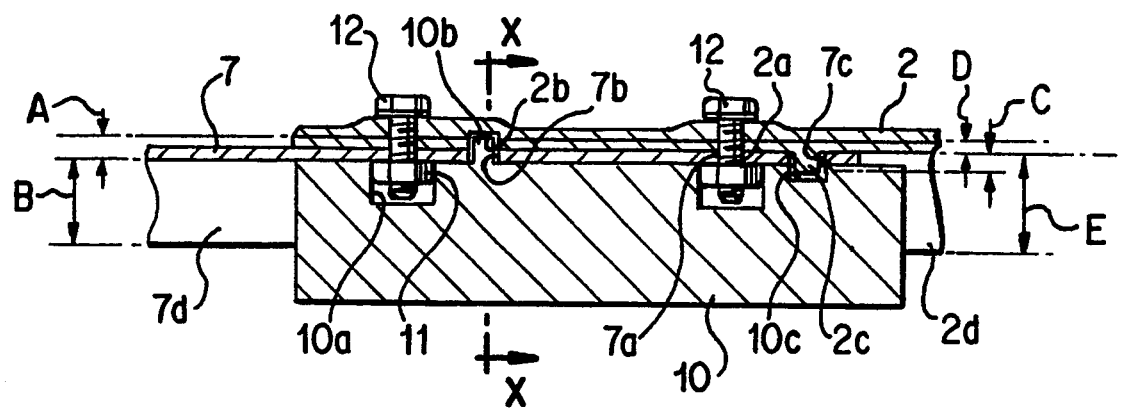
FIG. 5(A) is a diagram showing the frame and the first bracket set on an assembly jig.
Figure 5B:
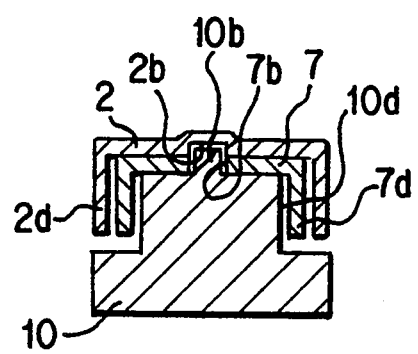
FIG. 5(B) is a sectional view taken along the line X—X of FIG. 5(A).

As stated above, the setting and positioning of the frame 7 with respect to the jig 10 is effected by causing the positioning protrusion 10b on the assembly jig 10 to be passed through the first positing hole 7b of the frame 7. When the frame 7 is formed by a bending process (rolling, bender forming or the like) and a high level of accuracy cannot be maintained in the dimension of the space between opposed sides 7d of the frame 7, it is impossible to pre-set the space between opposed sides 7d of the frame 7 in such a way as to come into contact with side surfaces 10d of the assembly jig 10 so that the positioning of the frame 7 with respect to the jig 10 can be effected around the axis of the positioning protrusion 10b (i.e., to the right and left as seen in FIG. 5(B)). Thus, as shown in FIG. 5(B), some play is involved in this case, i.e., the setting is made in such a way that the frame sides 7d are somewhat spaced apart from the side surfaces 10d of the assembly jig 10. This is the same with the relationship between the frame sides 7d and the two legs 2d of the first bracket 2 opposed thereto. Since it is necessary to ensure a fixed wiping range for the wiper arm, a smooth link operation, etc., the frame 7 and the first bracket 2 must be set with respect to each other with a high level of positioning accuracy, whereas the degree of accuracy for the positioning of the assembly jig 10 with respect to the frame 7 and the first bracket 2 may be regarded as enough when the bolts 12 can be mechanically inserted into the bolt holes by an automatic bolt fastening machine, which is equipped with the assembly jig 10. As described below, the frame 7 and the first bracket 2 can be positioned with respect to each other with high accuracy. Thus, the bolt holes can be positioned with respect to the bolt fastening machine accurately enough when the positioning protrusion 10b of the positioning jig 10 is fitted into the first positioning hole 7b of the frame 7 with high accuracy, even if the frame 7 is fitted onto the assembly jig 10 with some play between the jig side surfaces 10d and the frame sides 7d. A highly accurate positioning between the frame 7 and the first bracket 2 can be reliably effected by fitting the first bracket 2 onto the frame 7, which has been set and positioned on the assembly jig 10, so as to cause the positioning protrusion 10b of the assembly jig 10 to be fitted into the positioning recess 2b of the first bracket 2 and, at the same time, as to cause the positioning protrusion 2c of the first bracket 2 to be passed through the second positioning hole 7c of the frame. When the frame 7 and the first bracket 2 have been set and positioned in this way, they can be fastened to each other by the bolts 12, thus making it possible to perform the fastening process automatically with the frame 7 and the first bracket 2 positioned with high accuracy with respect to each other.

Further, in this embodiment, the protrusion length A of the positioning protrusion 10b of the assembly jig 10 is smaller than the length B of the sides 7d of the frame 7 (A<B), so that, when setting the frame 7 on the assembly jig 10, the frame 7 is first gently placed on the jig 10 in such a way that the sides 7d thereof are fitted onto the jig 10 and, in this condition, the frame 7 is shifted longitudinally, using the jig 10 as a guide, so as to enable the positioning protrusion 10b to be passed thorough the first positioning hole 7b, thus facilitating the setting of the frame 7.

The protrusion length C of the positioning protrusion 2c provided on the first bracket 2 is larger than the length D of the section of the positioning protrusion 10b protruding beyond the frame 7 (C>D), but is smaller than the length E of the legs 2d of the first bracket 2 (C<E). Thus, when setting the first bracket 2, it is first gently placed on the frame 7 in such a way that the legs 2d thereof are fitted onto the frame 7 and, in this condition, the first bracket 2 is shifted longitudinally, using the frame 7 as guide, so as to enable the positioning protrusion 2c to be passed through the second positioning hole 7c, thus facilitating the setting of the first bracket 2.

Thus, in accordance with the present invention, which has been described above, the frame and the first or second bracket are set and positioned with respect to the assembly jig by means of the positioning protrusion on the assembly jig side, and the frame and the first or second bracket are set and positioned with high accuracy with respect to each other by means of the positioning protrusion provided on the first and second bracket. Thus, even if a high level of precision cannot be expected from the dimension between the opposed sides of the frame (which is the case when the substantially U-shaped frame is one formed by bending), it is possible to perform the automatic bolt fastening with the frame and the first or second bracket positioned with high accuracy with respect to each other and set in this condition on the assembly jig, thus ensuring between the frame and the first or second bracket a connection which excels in versatility and which is highly accurate and reliable.

What is claimed is:

1. An assembly structure comprising:
    a removable jig having at least two spaced holes in a jig surface thereof, each hole having a size corresponding to a size of a nut received within each hole, a first positioning protrusion extending from said jig surface between said at least two holes, said jig having two side surfaces transverse to the jig surface and defining a jig width;
    a U-shaped frame member located on said jig surface of said removable jig and comprising a frame surface and two side frame surfaces, a width between said two side frame surfaces of said frame member being greater than said jig width, said frame surface of said frame member having at least two spaced holes corresponding in position to said at least two spaced holes in said removable jig, said frame surface of said frame member further including a first positioning hole corresponding in position and size to said first positioning protrusion on said jig for receiving said first positioning protrusion and a second positioning hole spaced from said first positioning hole;
    a U-shaped bracket member located on said frame member with the frame member between the U-shaped bracket member and the removable jig, said bracket member having at least two spaced holes corresponding in size and position to said at least two spaced holes in said frame member, said U-shaped frame member including a recess corresponding in position and size to said first positioning hole for receiving said first positioning protrusion of said assembly jig and a second positioning protrusion provided on the bracket member and extending through said second positioning hole on said frame member, said second positioning protrusion being in a truncated cone-like configuration tapering toward said frame member; and
    at least two bolts, each inserted respectively through a corresponding one of said at least two spaced holes of said bracket member and said frame member and fixedly attached to the nut located within the corresponding one of said at least two spaced holes of said removable assembly jig.

2. The assembly structure of claim 1, further comprising a recess in said jig into which said protrusion on the bracket fits within when the frame and said bracket are placed on said jig.

3. The assembly structure of claim 1, wherein said bracket member and said frame member are part of a wiper device.

4. The assembly structure of claim 1, wherein said positioning protrusion provided on said bracket member is located outside of a space defined between said at least two holes on said bracket member.

5. A positioning structure comprising an assembly jig, a frame and a bracket with the bracket integrally secured to an upper surface of the frame by means of bolts and nuts, said positioning structure further comprising:
    a first positioning protrusion formed on the assembly jig on which the frame is placed;
    a first positioning hole formed in the frame corresponding with the first positioning protrusion;
    a second positioning hole formed in the frame;
    a positioning recess provided in the bracket corresponding with the first positioning protrusion; and
    a second positioning protrusion provided in the bracket projecting toward the frame and corresponding with the second positioning hole;
    wherein the first positioning hole and the positioning recess are larger in diameter than the first positioning protrusion so as to be loosely fitted to the first positioning protrusion in order to set and position the frame and bracket on the assembly jig in a loosely positioned state, the second positioning protrusion having a substantially truncated-cone-like configuration with an extending end of a smaller diameter than the second positioning hole so as to be loosely fitted to the second positioning hole and a base end of the second positioning protrusion has substantially the same diameter as the second positioning hole, effecting a high-accuracy positioning between the bracket and the frame as the second positioning protrusion is fitted more deeply into the second positioning hole.

* * * * *